US00RE47446E

(19) United States
(12) Reissued Patent
Sugaya

(10) Patent Number: US RE47,446 E
(45) Date of Reissued Patent: Jun. 18, 2019

(54) WIRELESS COMMUNICATION SYSTEM, A WIRELESS COMMUNICATION APPARATUS, A WIRELESS COMMUNICATION METHOD, AND A COMPUTER PROGRAM

(71) Applicant: SONY CORPORATION, Tokyo (JP)

(72) Inventor: Shigeru Sugaya, Kanagawa (JP)

(73) Assignee: SONY CORPORATION, Tokyo (JP)

(21) Appl. No.: 14/683,856

(22) Filed: Apr. 10, 2015

Related U.S. Patent Documents

Reissue of:
(64) Patent No.: 8,064,950
Issued: Nov. 22, 2011
Appl. No.: 12/972,032
Filed: Dec. 17, 2010

U.S. Applications:
(63) Continuation of application No. 14/069,111, filed on Oct. 31, 2013, now Pat. No. Re. 45,469, which is an
(Continued)

(30) Foreign Application Priority Data

Sep. 22, 2003 (JP) ..... 2003-330362

(51) Int. Cl.
*H04M 1/00* (2006.01)
*H04W 28/06* (2009.01)
(Continued)

(52) U.S. Cl.
CPC ..... *H04W 28/06* (2013.01); *H04W 88/06* (2013.01); *H04W 48/08* (2013.01); *H04W 48/16* (2013.01); *H04W 84/12* (2013.01)

(58) Field of Classification Search
CPC ..... H04W 28/06; H04W 88/06; H04W 48/08; H04W 48/16; H04W 84/12; Y02B 60/50
See application file for complete search history.

(56) References Cited

U.S. PATENT DOCUMENTS 6,882,851 B2 * 4/2005 Sugar et al. ..... 455/454
7,302,227 B2 11/2007 Sakoda
(Continued)

FOREIGN PATENT DOCUMENTS

JP 5-75528 3/1993
JP 9-83427 3/1997
(Continued)

OTHER PUBLICATIONS

U.S. Appl. No. 13/452,013, filed Apr. 20, 2012, 2012-0218984, Sugaya.
(Continued)

*Primary Examiner* — Jeffrey D Carlson
(74) *Attorney, Agent, or Firm* — Xsensus LLP

(57) ABSTRACT

A wireless communication system of the invention comprises a plurality of communication stations decentralized-autonomously construct a network without having a relation between a control station and a station to be controlled under a communication circumstance where a plurality of channels are prepared. In this case, each of the communication stations prepares a plurality of operation modes for activating transmitting and receiving operations, informs the own operation mode, and receives information regarding operation modes of peripheral stations to manage its operation mode of each of the peripheral stations.

15 Claims, 10 Drawing Sheets

Related U.S. Application Data application for the reissue of Pat. No. 8,064,950, which is a continuation of application No. 12/723,249, filed on Mar. 12, 2010, now Pat. No. 7,894,853, which is a continuation of application No. 10/939,473, filed on Sep. 14, 2004, now Pat. No. 7,742,784.

(51) Int. Cl.

| | |
|---|---|
| ***H04W 88/06*** | (2009.01) |
| *H04W 48/08* | (2009.01) |
| *H04W 48/16* | (2009.01) |
| *H04W 84/12* | (2009.01) |

(56) References Cited

U.S. PATENT DOCUMENTS

| | | | | |
|---|---|---|---|---|
| 7,545,826 | B2 | 6/2009 | Sugaya | |
| 7,561,539 | B2 | 7/2009 | Sugaya | |
| 7,844,223 | B2 | 11/2010 | Sakoda | |
| 8,099,049 | B2 | 1/2012 | Sakoda | |
| 8,199,682 | B2 | 6/2012 | Sugaya | |
| 8,654,713 | B2 | 2/2014 | Sugaya | |
| 8,670,713 | B2 | 3/2014 | Sakoda | |
| 8,761,072 | B2 | 6/2014 | Sakoda | |
| 8,837,448 | B2 | 9/2014 | Sakoda | |
| 8,989,170 | B2 | 3/2015 | Sugaya | |
| 2002/0003848 | A1* | 1/2002 | Wendorff | 375/356 |
| 2003/0185170 | A1* | 10/2003 | Allen | H04W 56/00 370/329 |
| 2006/0068820 | A1 | 3/2006 | Sugaya et al. | |
| 2012/0218984 | A1 | 8/2012 | Sugaya | |
| 2014/0016528 | A1 | 1/2014 | Sugaya | |
| 2014/0112316 | A1 | 4/2014 | Sugaya | |
| 2014/0148106 | A1 | 5/2014 | Sugaya | |
| 2015/0016391 | A1 | 1/2015 | Sakoda | |
| 2015/0173076 | A1 | 6/2015 | Sugaya | |

FOREIGN PATENT DOCUMENTS

| | | |
|---|---|---|
| JP | 9-139708 | 5/1997 |
| JP | 2002-300175 | 10/2002 |
| JP | 2003-229869 | 8/2003 |

OTHER PUBLICATIONS

U.S. Appl. No. 14/041,178, filed Sep. 30, 2013, 2014-0016528, Sugaya.

U.S. Appl. No. 14/633,577, filed Feb. 27, 2015, 2015-0173076, Sugaya.

U.S. Appl. No. 14/137,016, filed Dec. 20, 2013, 2014-0112316, Sugaya.

U.S. Appl. No. 14/482,708, filed Sep. 10, 2014, 2015-0016391, Sakoda.

U.S. Appl. No. 14/172,960, filed Feb. 5, 2014, 2014-0148106, Sugaya.

* cited by examiner

| BEACON IDENTIFIER | DATA LENGTH | RECEIVING TARGET COMMUNICATION STATION ADDRESS INFORMATION | TRANSMISSION SOURCE COMMUNICATION STATION ADDRESS INFORMATION | AFFILIATION GROUP INFORMATION | OPERATION MODE INFORMATION | | ERROR DETECTION CODE |
|---|---|---|---|---|---|---|---|

FIG. 9

| | | | | |
|---|---|---|---|---|
| REGISTERED NODE NUMBER #1 | ADDRESS #1 | AFFILIATION GROUP | RECEIVING OPERATION MODE #1 | TRANSMITTING OPERATION MODE #1 |
| REGISTERED NODE NUMBER #2 | ADDRESS #2 | AFFILIATION GROUP | RECEIVING OPERATION MODE #2 | TRANSMITTING OPERATION MODE #2 |
| REGISTERED NODE NUMBER #3 | ADDRESS #3 | AFFILIATION GROUP | RECEIVING OPERATION MODE #3 | TRANSMITTING OPERATION MODE #3 |
| ⋮ | ⋮ | ⋮ | ⋮ | ⋮ |
| REGISTERED NODE NUMBER #n | ADDRESS #n | AFFILIATION GROUP | RECEIVING OPERATION MODE #n | TRANSMITTING OPERATION MODE #n |

WIRELESS COMMUNICATION SYSTEM, A WIRELESS COMMUNICATION APPARATUS, A WIRELESS COMMUNICATION METHOD, AND A COMPUTER PROGRAM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a continuation of U.S. Reissue application Ser. No. 14/069,111 filed on Oct. 31, 2013; and each of the foregoing applications is also an application for the reissue of U.S. Pat. No. 8,064,950, which issued Nov. 22, 2011 and corresponds to U.S. patent application Ser. No. 12/972,032, filed on Dec. 17, 2010. Thus, the present application is a continuation reissue application.*

CROSS-REFERENCE TO RELATED APPLICATIONS

This application is a continuation of U.S. application Ser. No. 12/723,249, filed Mar. 12, 2010, which is a continuation of U.S. application Ser. No. 10/939,473, filed Sep. 14, 2004, and claims priority under 35 U.S.C. 119 to Japanese Application No. 2003-330362 filed Sep. 22, 2003, the entire contents of all of which are incorporated herein by reference.

BACKGROUND OF THE INVENTION

1. Field of the Invention

The present invention relates to a wireless communication system, a wireless communication apparatus, a wireless communication method, and a computer program, for executing mutual communications among a plurality of wireless stations such as wireless LAN (Local Area Network) communications, and particularly to a wireless communication system, a wireless communication apparatus, a wireless communication method, and a computer program, in which such wireless network is managed by executing asynchronous and direct communications among terminals (random access).

More specifically, the present invention relates to a wireless communication system, a wireless communication apparatus, a wireless communication method, and a computer program, in which a wireless network is constructed by decentralized autonomous operation of each communication station without providing a special apparatus serving as a control station, and particularly relates to a wireless communication system, a wireless communication apparatus, a wireless communication method, and a computer program, in which each communication station executes intermittent receiving/transmitting operation to perform power saving.

2. Description of the Related Art

As a system capable of releasing users from LAN wirings of a wired system, wireless LAN system is attracting most attention. The use of the wireless LAN provides relatively easy movement of communication terminals such as personal computers (PC), because a most part of wiring cables can be omitted in a working area such as an office space. Recently, along with the advance in high-speed and low cost in the wireless LAN, its demand considerably is increasing. In particular, in recent years, the introduction of the personal area network (PAN) was studied for carrying out information communications by constructing a small-area wireless network among a plurality of electronic apparatuses existing around persons. For example, various wireless communication systems and wireless communication apparatuses are standardized using frequency bands, such as 2.4 GHz band or 5 GHz band, requiring no license by the governments.

As general standards regarding the wireless network, the IEEE (The Institute of Electrical and Electronics Engineers) 802.11 standard, (for example, refer to a non-patent document 1) or, HiperLAN/2 standard (for example, refer to Non-Patent Document 2 or 3), the IEEE 302.15.3 standard, the Bluetooth communication, or the like are proposed. In the IEEE 802.11 standard, various wireless communication methods exist such as the IEEE 802.11a standard, the IEEE 802.11b standard, and the like.

Generally, such method is employed in which, in order to construct a local area network with the wireless technology, an apparatus is provided within an area as a control station, which is called "access point" or "coordinator", to construct a network under the overall control by this control station.

In the wireless network where an access point is arranged, an access control method on the basis of reservation of a transmission band is generally employed in which at first, the transmission band necessary for transmitting information is reserved at the access point and then carries out the usage of a transmission path in order to avoid collisions with an information transmission from other communication apparatuses in the case that the information transmission is carried out from a communication apparatus. In other words, the arrangement of the access point provides synchronous wireless communications where the communication apparatuses within the wireless network obtain synchronization with each other.

However, the asynchronous communication between communication apparatuses at a transmission side and a reception side in the wireless communication system where the access point exists always requires interfacing by the access point for the wireless communications, so that there is a problem that the utilizing efficiency of the transmission line considerably decreases.

On the other hand, as another method for establishing a wireless network "Ad-hoc (Ad-hoc) communication" is proposed in which each of terminals directly, asynchronously, and wirelessly communicates with each other. In particular, in a small-area wireless network constructed with a relatively small number of adjacently located clients, the Ad-hoc communication is recommended in which any terminal can execute direct, and asynchronous wireless communications without any specific access point.

For example, in a wireless LAN system adopting the IEEE 802.11 system, an Ad-hoc mode is prepared in which it operates decentralized-autonomously in the manner of a peer to peer (Peer to Peer) communication without the arrangement of the control station. In this operation mode, when a beacon transmission timing comes, each terminal counts for a random interval. When any beacon from another terminal is not received until the period expires, the terminal transmits a beacon of itself.

In this case, if a communication station always carries out a waiting for reception, its electric power is consumed in vain. In particular, the problem of the power consumption in mobile apparatuses powered by a battery is serious. Thus, a lot of wireless apparatuses employs so-called intermittent transmitting and receiving operations in order to reduce its power consumption.

In a conventional wireless communicating system, generally a method is adopted in which a control station is arranged in a wireless network, and an intermittent receiving operation is defined under the overall control by the control station. More specifically, such a structure in which each communication station requests the control station for the intermittent receiving operation, and then receives a specified timing of the intermittent receiving operation from the control station is employed. When a certain timing comes, the communication station starts the receiving operation to surely receive the signal from the control station.

Alternatively, there is another method of transmitting and receiving operations in which a control station sets a time domain that the control station uses in its own network, and all stations execute the transmitting and receiving operations in synchronism with the time domain.

However, in the conventional intermittent receiving operation as described above, generally, the communication station as the control station manages the intermittent transmitting and receiving operations of other communication apparatuses, so that there is a problem that the intermittent transmitting and receiving operations cannot be set in the decentralized-autonomous type of communication systems where no control station exists.

In particular, in the case that a lot of frequencies for the intermittent transmitting and receiving operations are prepared, and the operations are set every time of the transmission and reception in accordance with a frequency of the data transmission and reception, the control station should hold an operation condition of the respective communication station, so that a load regarding the network management on the control station becomes excessively large.

Further, in the case of changing the frequency of the intermittent transmitting and receiving operations, the frequency has to be changed with synchronization in the same system, otherwise, the wireless communication apparatuses included in the system cannot operate.

On the other hand, in the decentralized-autonomous type of wireless communication system in which no control station is arranged, it is difficult to set the intermittent transmitting and receiving operations, so that the operations are required in a condition always allowing transmitting and receiving operations irrespective of the communication frequency. This results useless power consumption.

Non-Patent Document 1

International Standard ISO/IEC8802-11: 1999(E) ANSI/IEEE Std. 802.11, 1999 Edition, Part11: Wireless LAN Medium Access Control (MAC) and Physical Layer (PHY) Specifications.

Non-Patent Document 2

ETSI Standard ETSI TS 101 761-1 V1.3.1 Broadband Radio Access Networks (BRAN); HIPERLAN Type 2; Data Link Control (DLC) Layer; Part1: Basic Data Transport Functions.

Non-Patent Document 3

ETSI TS 101 761-2 V1.3.1 Broadband Radio Access Networks (BRAN); HIPERLAN Type 2; Data Link Control (DLC) Layer; Part2: Radio Link Control (RLC) sublayer.

SUMMARY OF THE INVENTION

One of aspects of the present invention is to provide a superior wireless communication system, a wireless communication apparatus, a wireless communication method, and a computer program in which a wireless network is constructed by decentralized-autonomously operating each communication station without arranging a special apparatus as a control station.

A further aspect of the present invention is to provide a superior wireless communication system, a wireless communication apparatus, a wireless communication method, and a computer program, in which power saving is carried out by executing intermittent transmitting and receiving operations at each communication station under a decentralized-autonomous type of communication circumstance.

A further aspect of the present invention is to provide a superior wireless communication system, a wireless communication apparatus, a wireless communication method, and a computer program, in which intermittent transmitting and receiving operations and a low power consumption operation are implemented by defining a plurality of operation modes having different activity levels (power consumption) and by decentralized-autonomously managing the operation modes of own and peripheral communication stations by each communication station.

The present invention is provided in consideration of the above-mentioned problem, in which one aspect is a wireless communication system where a plurality of communication stations decentralized-autonomously construct a network without having a relation between a control station and a station to be controlled under a communication circumstance where a plurality of channels are prepared, the wireless communication system is characterized in that each of communication stations prepares a plurality of operation modes for activating transmitting and receiving operations, informs the own operation mode, and receives information regarding operation modes of peripheral stations to manage its operation mode of each peripheral station.

However, the term "system" described here means one in which a plurality of apparatuses (or functional modules for providing a pacific function) are logically assembled, irrespective of whether each apparatus or each functional module exist in a single body or not.

Under the decentralized-autonomous type of communication circumstance, each communication apparatus lets adjacent (within its communicable area) other communication stations know the own existence, and informs them of the network structure by transmitting the beacon information. Further, a communication station newly entering the communicable area of a communication station detects the entry to the communicable area by receiving a beacon signal and can know the network structure by decoding the information described in the beacon.

Further, each communication station transmits the beacon signal in which adjacent apparatus information regarding beacon transmission timing of peripheral stations is included. In such a case, the communication station can judge whether the transmission source of the target beacon is from the adjacent station or the next adjacent station in accordance with whether the communication station can actually hear the beacon when the beacon is to be received from peripheral station. In other words, if the beacon signal is from an adjacent station, it is known when the beacon is received. On the other hand, if the beacon to be received is at a transmission position which is not heard by the own station, it is known that it is one from a next adjacent, namely, a hidden terminal for the own station.

Here, in the wireless system according to the present invention, a plurality of operation modes are defined in which receiving periods, namely, activities are different from each other, so that each communication station decentralized-autonomously sets its own operation mode. Further, each communication station can informs its operation mode by describing information regarding operation modes of its own station and/or peripheral stations.

When transmitting data to a peripheral station, the communication station sets the own station's transmitting mode in accordance with the operation mode set in the target peripheral station to execute data transmission at timing specified in accordance with the target transmitting operation mode.

In this case, the communication station may set its own operation mode in accordance with a frequency of receiving information directed to the own station. Alternatively, the communication station may set the own station's operation mode in accordance with a frequency of transmitting information from the own station.

Further, a second aspect of the present invention is a computer program described in a computer-readable form for executing on a computer system a process for decentralized-autonomously operating under a wireless communication circumstance in which no control station intervenes, the computer program is characterized by an operation mode setting step of preparing a plurality of operation modes in which a transmitting operation is active and setting operation modes of transmission and reception in the own station, a control step of controlling a communication operation in accordance with the operation mode set in said operation mode setting step, an informing step for informing peripheral stations of information regarding the own station's operation mode, and peripheral station operation information management step, at every station, of managing information regarding the operation mode informed from peripheral stations.

The computer program regarding the second aspect of the present invention defines a computer program described in a computer-readable form to provide a predetermined process on a computer system. In other words, installation of the computer program regarding the second aspect of the present invention in a computer system provides a cooperative function on the computer system to provide operation of a wireless communication apparatus. Constructing a wireless network by activating a plurality of such wireless communication apparatuses provides the same functional effect as the wireless communication system regarding the first aspect of the present invention.

According to the present invention, a superior wireless communication system, a wireless communication apparatus, a wireless communication method, and a computer program are provided in which decentralized-autonomous operation of each communication station without arranging a special apparatus as a control station constructs a wireless network.

According to the present invention, a superior wireless communication system, a superior wireless communication apparatus, a wireless communication method, and a superior computer program are provided in which under a decentralized-autonomous type of communication circumstance, each communication station executes intermittent transmitting and receiving operation to save power consumption.

According to the present invention, a superior wireless communication system, a wireless communication apparatus, a wireless communication method, and a computer program are provided, in which a plurality of operation modes having different activity levels (power consumption) are defined, and intermittent transmitting and receiving operations and low power consumption is provided by that each communication station decentralized-autonomously manages the operation modes of the own station and peripheral stations.

According to the present invention, the communication station manages an operation condition of each peripheral station to decentralized-autonomously provide power saving operations without functioning a specific communication apparatus as a control station.

Each communication station can hold operation conditions of peripheral stations without exchanging special messages by describing the operation mode in the beacon signal at each predetermined transmission frame period to inform the operation mode.

Further, each communication station can immediately change its own operation mode together with the beacon transmission, which eliminates the necessity of waiting for arrival of an ACK or other confirmation signals from other stations. Each communication station decentralized-autonomously set its own operation mode and informs this to peripheral stations.

Further, when transmitting data to a peripheral station, the communication station does not request the peripheral station to change the operation mode, but sets the transmitting operation mode linked to the partner's receiving operation mode. No setting the transmitting operation mode for other peripheral stations provides low power consumption operation.

Further, according to the present invention, even though a communication station disappears, there is no influence upon the operational conditions of other peripheral stations by management by deleting that operation condition.

Further, according to the present invention, the operation condition indicated by a given communication station is memorized as the receiving operation mode of the communication station, which provides communication with a delay process being kept to a minimum, when a transmission request for the communication apparatus occurs, by executing a transmission process in accordance with the operation condition. More specifically, this can eliminate such latency that a transmission request is transmitted to the transmission partner and the data transmission is executed after recovery to a higher operation mode capable of a data receiving process.

Further, according to the present invention, the transmitting operation mode is managed at each peripheral station to reduce power consumption.

Further, according to the present invention, in the absence of reception over a predetermined time interval, setting the own receiving mode low can define a more efficient power consumption saving operation mode.

Further objects and features of the present invention will become more readily apparent from the following detailed description taken in conjunction with the embodiments mentioned below and the accompanying drawings.

BRIEF DESCRIPTION OF THE DRAWINGS

FIG. 9 is a drawing illustrating an example of a structure a management table of adjacent apparatus information;

DESCRIPTION OF THE PREFERRED EMBODIMENTS

Figure 1:
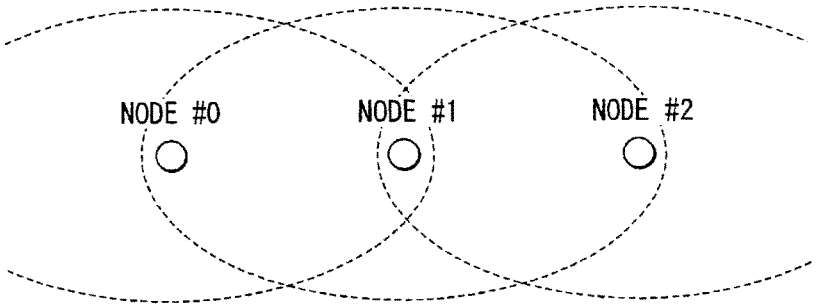
FIG. 1 is a drawing schematically illustrating a structure of a decentralized-autonomous type of wireless network according to one embodiment of the present invention.

Hereinbelow, embodiments of the present invention will be described in detail with reference to drawings.

The transmission path for communication assumed in the present invention is a wireless type, and a network is constructed among a plurality of communication stations with a transmission medium comprising a predetermined frequency channel. Further, the communication assumed in the present invention is a storage exchanging type of traffic in which information is transmitted in a unit of packet.

The wireless network system according to the present invention has a system structure of a decentralized-autonomous type in which no coordinator is arranged for providing transmission control effectively utilizing a plurality of channels with a transmission (MAC) frame having a moderate time-division multiple access structure. Further, each communication station can execute the Ad-hoc communication for directly, asynchronously transmitting information in accordance an access procedure on the basis of the CSMA (Carrier Sense Multiple Access).

In the wireless communication system in which no special control station is arranged as described above, each communication station informs its existence and a network structure to other adjacent (within its communicable area) communication stations by informing the beacon information. Further, a communication station newly entering the communicable area of a communication station is able to detect the entrance into the communicable area by receiving of a beacon signal, and also is able to know the network structure by analyzing the information described in the beacon. In addition, because the communication station transmits the beacon at the top of a transmitting frame period, the transmitting frame period is defined by the interval of the beacon.

Here, if the communication station always carries out waiting for reception, there is a problem that electric power is consumed uselessly. Thus, the intermittent receiving operation is defined to save the power consumption.

In the conventional wireless communication systems, generally, a method is adopted, in which a control station is arranged in a wireless network to specify an intermittent transmitting and receiving operations under overall control by the control station. In other words, there was a problem that, in the decentralized-autonomous type of communication system where no control station existed, the intermittent transmitting and receiving operations could not be set.

Then, in the present invention, each communication station decentralized-autonomously manages times where its own station and peripheral stations are active, and decides the times where its own station and peripheral stations are active when the mode is active from the operation modes of its adjacent communication stations. A description in the beacon signal periodically transmitted by a communication station informs the operation mode at that point, and manages the time where the peripheral stations are active. When the communication station transmits data to an adjacent station, low power consumption is attained by setting the transmission of own station active at the timing when the adjacent station is active, i.e., by setting the transmitting operation mode linked to the partner's receiving mode, and not setting setting the transmitting operation mode to the other peripheral stations. The decentralized-autonomous intermittent operation will be described in detail later.

The process at each communication station described below is basically a process executed at all communication stations that enter the decentralized-autonomous type of network according to the present invention. However, in some case, all of the communication stations constructing the network not always execute the process described below.

FIG. 1 schematically illustrates a structure of the decentralized-autonomous type of wireless network according to an embodiment of the present invention.

The example shown in FIG. 1 represents a condition in which three wireless communication apparatuses (Node #0), (Node #1), and (Node #2) exist in the same space, and operates, respectively.

In the same drawing, the Node #0 at the left of the drawing has a communicable positional relation with the Node #1 at the center of the drawing. The Node #1 at the center of the drawing has a communicable positional relation with the Node #0 at the left of the drawing and the Node #2 at the right of the drawing. The Node #2 at the right of the drawing has a communicable relation with the Node #1 at the center of the drawing. In other words, the Node #0 at the left of the drawing and the Node #2 have a hidden terminal relation there-between.

Figure 2:
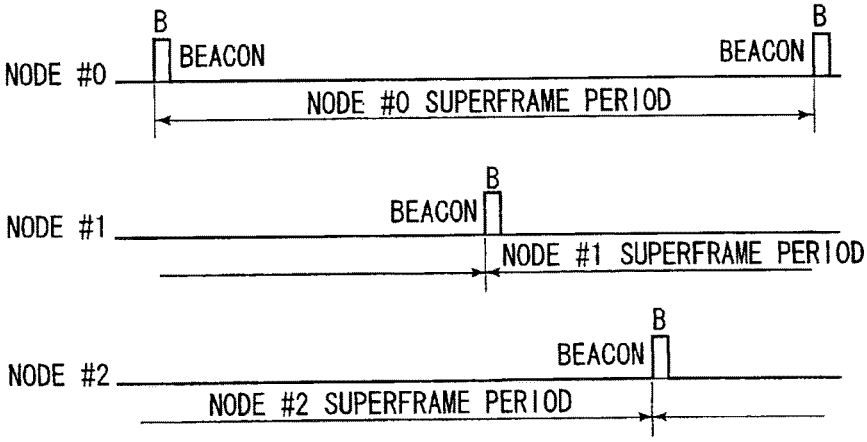
FIG. 2 is a drawing for illustrating an example of a network operation example provided by each station's decentralized-autonomous operation.

FIG. 2 illustrates an example of network operation implemented by decentralized-autonomous operation of each communication station.

Each station periodically transmits a beacon signal including predetermined information regarding the network structure to set a predetermined super-frame period (T_SF). In the example shown in FIG. 2, each communication station sets the superframe time periods having the same length and transmits the beacon at different timing to avoid collisions of the beacon signals to provide coexistence in the same space.

Figure 3:
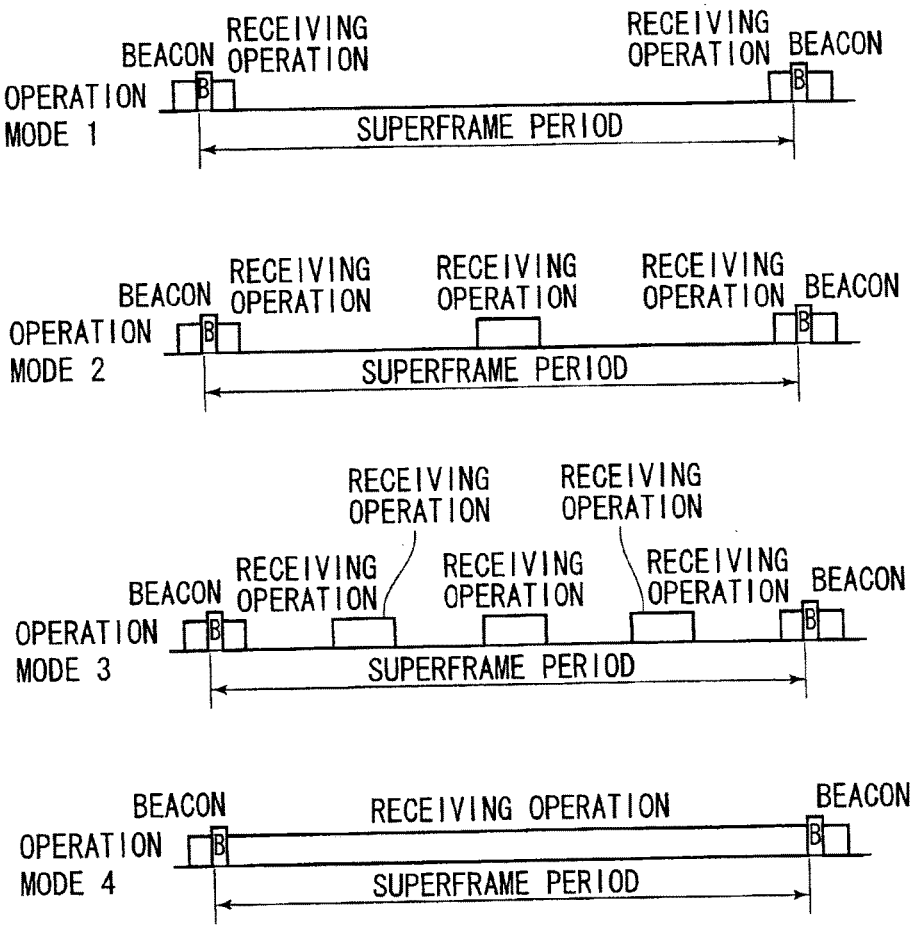
FIG. 3 is a drawing illustrating an example of a structure of super frame periods in respective operation modes.

In this embodiment, the communication station defines four different operation modes 1 to 4 regarding a level of activity, namely, power consumption. FIG. 3 illustrates an example of a structure of the superframe period in each operation mode. In the example shown in this drawing, different power consumptions are defined at receiving regions within the superframe period in the operation modes in accordance with the setting methods, respectively.

The operation mode 1 executes a low power consumption operation where in which a receiving process is executed at the time of the own transmission beacon and before and after thereof The operation mode 2 executes the receiving process during a predetermined time interval in addition to the operation mode 1. The operation mode 3 further executes the receiving process during a predetermined time interval in addition to the operation mode 2. The operation mode 4 usually executes the receiving operation except when the transmission of the beacon signal is carried out.

Each communication station can autonomously set its own operation mode from the above-mentioned operation modes and describes it on the beacon signal in order to inform its peripheral stations (mentioned later). Further, upon the data transmission, a transmitting operation mode linked to the receiving operation of the transmission partner is set.

Further, any other operation mode other than above mentioned modes may be defined, so that each communication apparatus can set its operation mode upon request.

Figure 4:
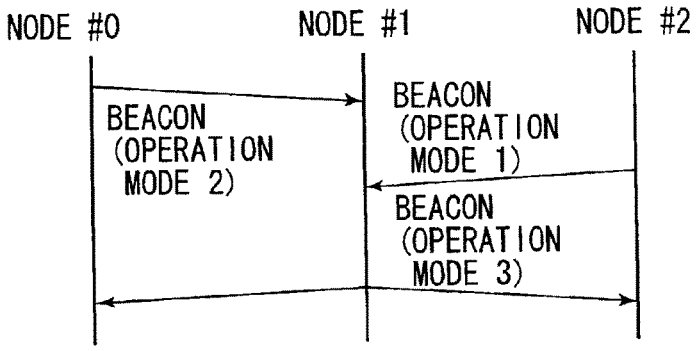
FIG. 4 is a sequence drawing illustrating a condition of exchanging operation mode information by respective communication stations by informing beacon signals.

FIG. 4 illustrates a condition in which each communication station exchanges its operation mode information by informing the beacon signals.

In the example shown in FIG. 4, with the operation mode information described in the beacon transmitted by the Node #0, its adjacent station Node #1 can acquire the existence of the Node #0 and its receiving operation mode by receiving the beacon.

Further with the operation mode information described in the beacon transmitted by the Node #1, its adjacent stations Node #1 and Node #2 can acquire the existence of the Node #1 and its receiving operation mode by receiving the beacon.

Further, with the operation mode information described in the beacon transmitted by the Node #2, its adjacent station Node #1 can acquire the existence of the Node #2 and its receiving operation mode by receiving the beacon.

Figure 5:
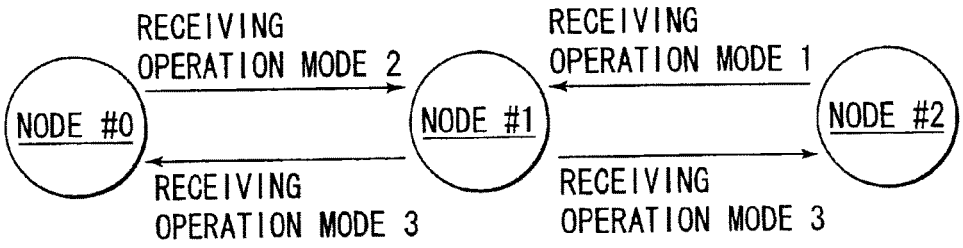
FIG. 5 is a drawing illustrating an example of a method of managing operation modes set among respective communication stations.

FIG. 5 shows an example of a method of managing operation modes set among respective communication stations. In the example in FIG. 5, it is assumed that the communication station uses three operation modes.

The Node #0 at the left of the same drawing receives the operation mode 3 from the Node #1 at the center of the drawing, so that within the station, the receiving operation mode of the Node #1 is set to be 3 for control.

Because the Node #1 at the center of the same drawing receives the operation mode 2 from the Node #0 at the left of the drawing, the receiving operation mode of the Node #0 is set to be 2, and the receiving operation mode of the Node #2 is set to be 1 because it receives the operation mode 1 from the Node #2 at the right of the drawing.

The Node #2 at the right of the same drawing receives the operation mode 3 from the Node #1 at the center of the drawing, so that the receiving operation mode 3 of the Node #1 is set to be 3 for control.

As described above, each communication station acquires the operation modes of the peripheral stations for decentralized-autonomous control.

Figure 6:
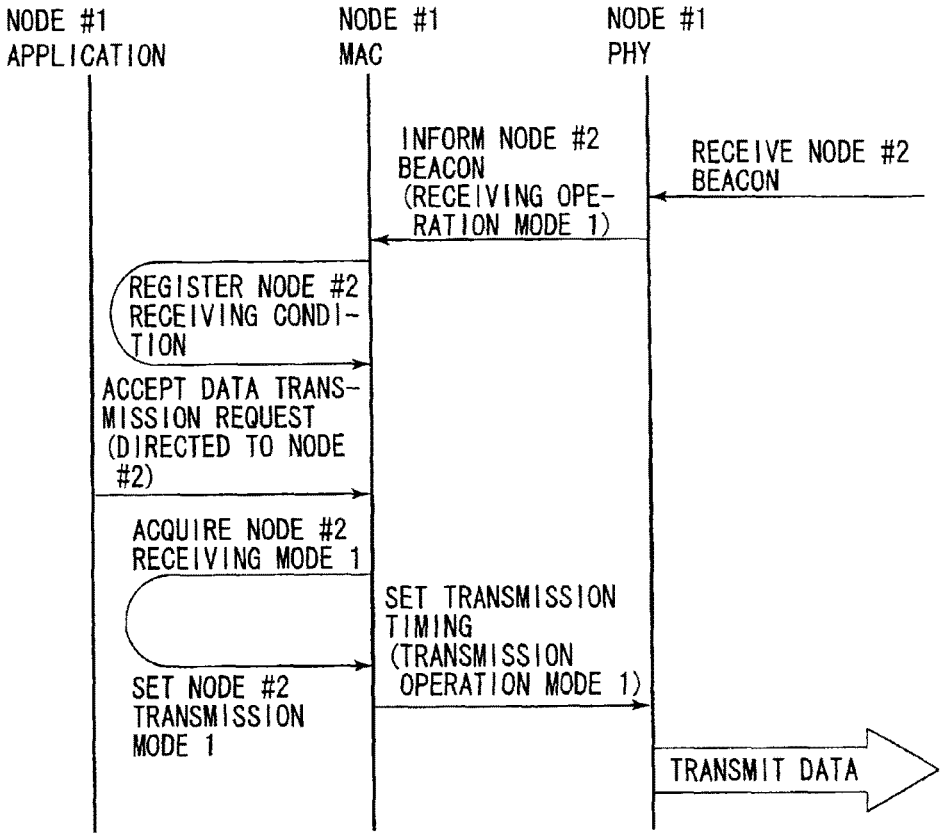
FIG. 6 is a drawing illustrating a processing procedure for setting transmitting operation mode at communication stations.

FIG. 6 shows, in the communication station, a processing procedure for setting a transmitting operation mode. Here, the communication station controls the communication operation by two layers of communication protocols, namely, an application layer, an MAC (Machine Access Control) layer, and a PHY (physical) layer. The example shown in the drawing shows the operation for setting the transmitting operation mode for an adjacent station as an internal operation of the communication apparatus Node #1.

In the PHY layer of the communication station Node #1, the beacon is received from an adjacent station Node #2, and it is acquired that the Node #2 operates in the mode 1 by analyzing the information of the beacon in the MAC layer. Then, in the MAC layer, its operation mode is registered.

On the other hand, when a data transmission request is received from an application operating in an external apparatus connected to the communication station Node #1 such as a personal computer, the destination communication station (here, it is assumed as the adjacent station Node #2) is judged in the MAC layer, and acquires the receiving operation mode of the Node #2 which is registered.

Then, the transmitting operation mode for the Node #2 is set to be the same operation mode 1 as the receiving operation mode.

Further, the MAC layer sets the transmission timing in accordance with its operation mode for the PHY layer. Thus, a data transmission process is executed when a predetermined transmission timing comes.

Figures 7, 8:
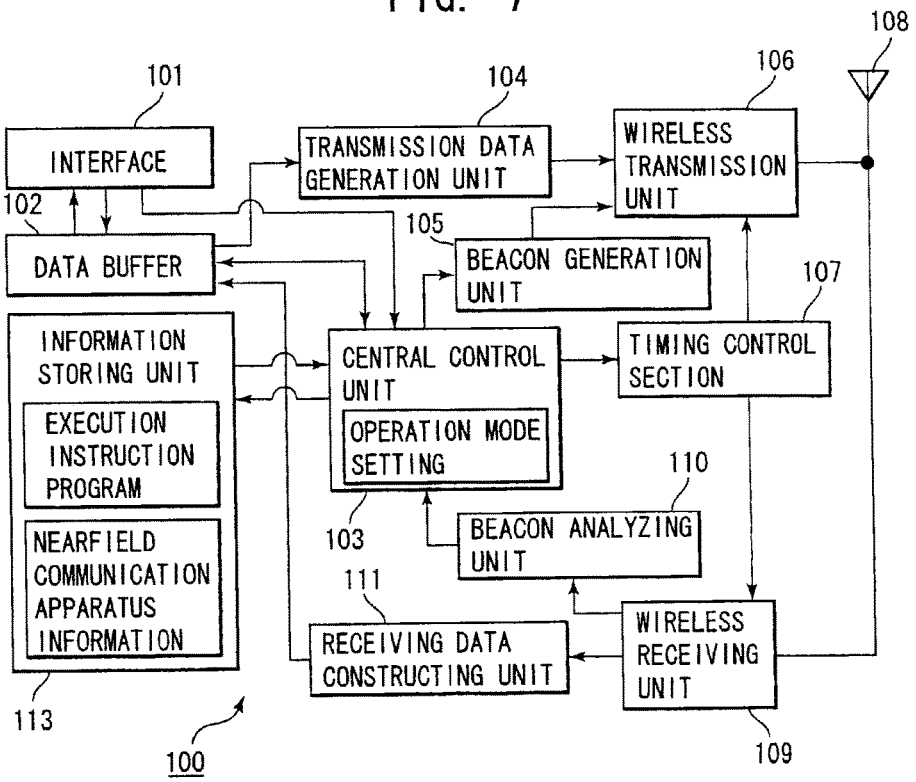
FIG. 7 is a drawing schematically illustrating a functional structure of a wireless communication apparatus operating as a communication station in a decentralized-autonomous type of wireless communication network according to the present invention.
FIG. 8 is a drawing illustrating an example of a structure beacon information.

FIG. 7 schematically illustrates a functional structure of the wireless communication apparatus operating as the communication station in the decentralized-autonomous type of wireless communication network according to the present invention. The wireless communication apparatus 100 comprises an interface 101, a data buffer 102, a central control unit 103, a transmission data generation unit 104, a beacon generation unit 105, a wireless transmission unit 106, a timing control unit 107, an antenna 108, a wireless receiving unit 109, a beacon analyzing unit 110, a receiving data constructing unit 111, and an information storage unit 113.

The interface 101 interchanges various types of information with an external apparatus (e.g. personal computer (not shown) etc.) constructing the application layer on the communication protocol connected to this wireless communication apparatus.

The data buffer 102 is used to temporarily store data transmitted from the application layer connected via the interface 101 and data received via the wireless transmission path before transmitting the data via the interface 101 to the application layer. The data buffer 102 is constructed in a data link layer.

The central control unit 103 executes a sequential information transmission, a receiving process control, an access control, and further setting of an operation mode for the own station and an operation mode upon transmission in the wireless communication apparatus 100 in an integral fashion. The central control unit 103 sets the current operation mode in accordance, for example, with the frequency of transmitting and receiving operations.

The transmission data generation unit 104 carries out a coding process of the data body as a transmission target stored in the data buffer 102 in a predetermined coding style and further adds error correction codes or error detection codes to generate transmission data. The transmission data generation unit 104 is constructed by, for example, the data link layer and the MAC layer.

The beacon generation unit 105 generates the beacon signal periodically interchanged between adjacent wireless communication apparatuses. In order that the wireless communication apparatus 100 manages the wireless network, a transmission slot position of its own beacon, a receiving slot position of the peripheral station's beacon, the own scan operation period, a current operation mode depending on a frequency of transmitting and receiving operations or the like are specified. These pieces of information are stored in the information storage unit 113, and also described in the beacon signal to inform to the peripheral wireless communication apparatuses. The structure of the beacon signal will be described later. Because the wireless communication apparatus 100 transmits a beacon at the top of the transmission frame period, a transmission frame period in each channel that the wireless communication apparatus 100 uses is to be defined by the interval of the beacon. The beacon generation unit 105 is constructed in the MAC layer.

The wireless transmission unit 106 executes a predetermined modulation process to wirelessly transmit data temporarily stored in the data buffer 102 and the beacon signal. The wireless transmission unit 106 is constructed in the PHY layer.

The antenna 108 wirelessly transmits a signal to other wireless communication apparatuses on a predetermined frequency channel and collects signals transmitted from other wireless communication apparatuses. In this embodiment, a single antenna is provided, so that transmission and reception cannot be executed in parallel.

The wireless receiving unit 109 executes a receiving process for signals such as data information and beacons transmitted from the peripheral stations. For the wireless transmitting and receiving system in the wireless transmission unit 106 and the wireless receiving unit 109, various types of communication methods suitable for relatively near field communication and applicable, for example, to a wireless LAN, can be adopted. More specifically, the UWB (Ultra Wide Band) system, the OFDM (Orthogonal Frequency Division Multiplexing) system, the CDMA (Code Division Multiple Access) system or the like can be adopted. The wireless receiving unit 109 is constructed, for example, as a PHY layer.

The timing control unit 107 controls the timing of transmitting and receiving operations in accordance with the operation mode determined by the central control unit 103. For example, it determines the transmission timing of the own beacon at the top of the superframe period and the receiving timing of the beacon signals from the peripheral stations, and further controls data transmitting and receiving timings in accordance with the transmitting and receiving operation modes. For example, the operation mode is determined in accordance with the frequency of the transmitting and receiving processes in the own station. Further, upon data transmission, it sets the transmitting operation mode linked to the receiving operation mode of the transmission partner. The timing control unit 107 is constructed, for example, as an MAC layer.

The beacon analyzing unit 110 analyses the beacon signal that can be received from an adjacent station to analyze the existence of the adjacent wireless communication apparatus. For example, the information such as the operation mode of the adjacent station is analyzed as the adjacent apparatus information which is stored in the information storage unit 113. The beacon analyzing unit 110 is constructed, for example, as the MAC layer.

The receiving data constructing unit 111 constructs data information actually transmitted from the data signal that can be received by the antenna 108 and the wireless receiving unit 109. The receiving data constructing unit 111 is constructed, for example, in a data link layer. The reconstructed data information is once stored in the data buffer 102 and transferred to the application layer via the interface 101.

The information storage unit 113 stores execution procedure commands for a sequence access control operation executed in the central control unit 103 (programs of a scan setting, the operation mode setting of the own station), and adjacent apparatus information such as transmission timing of the beacons of other communications, and operation modes of the peripheral stations.

FIG. 8 illustrates an example of a structure of the beacon information transmitted at each predetermined superframe period by each communication station in the wireless network according to the embodiment. The information included in the bacon signal transmitted from each communication station is constructed by the following elements.

A beacon identifier field indicates that this signal is beacon information. An information length field describes a length of the beacon information. A receiving target communication apparatus address information field specifies an address of the wireless communication apparatus receiving this beacon information (a broadcast address is described because of no special specification). A transmission source communication apparatus address information field describes address information inherent to the communication station as a transmission source of this beacon. An affiliation group field describes information for identifying a network group including the communication station as the transmission source of this beacon. An operation mode information field describes the operation mode currently set in the communication station as a source of this beacon. Further, other information is set if necessary, and at the end of the beacon information, an error detection code for detecting an error is added in this beacon information.

FIG. 9 illustrates an example of a structure of a management table of adjacent apparatus information used in the decentralized-autonomous type of wireless network according to the present invention. A communication station constructs an adjacent apparatus information management table on the basis of the operation modes obtained from the received beacon information, and is able to decentralized-autonomously manage the operation modes of peripheral stations using the table.

In the example of the drawings, the table is constructed for each communication station that could receive the beacon, and is sequentially set in response to each reception of the beacon, and the tables are prepared until the number of the tables reaches a given number (n). The n depends, for example, on the maximum number of the communication stations capable of entering the network at the same time.

Each management table includes fields of a registered node number, address information, the affiliation group information, receiving operation mode information, transmitting operation mode information or the like.

In each management table, the operation mode of the target communication station is set as the receiving operation mode. If there is transmission data to a peripheral station, the communication station refers to the corresponding management table entry, substitutes a value of the receiving operation mode of the transmission target communication station for the transmitting operation mode to set the transmission timing of data and then executes a transmitting operation.

Figure 10:
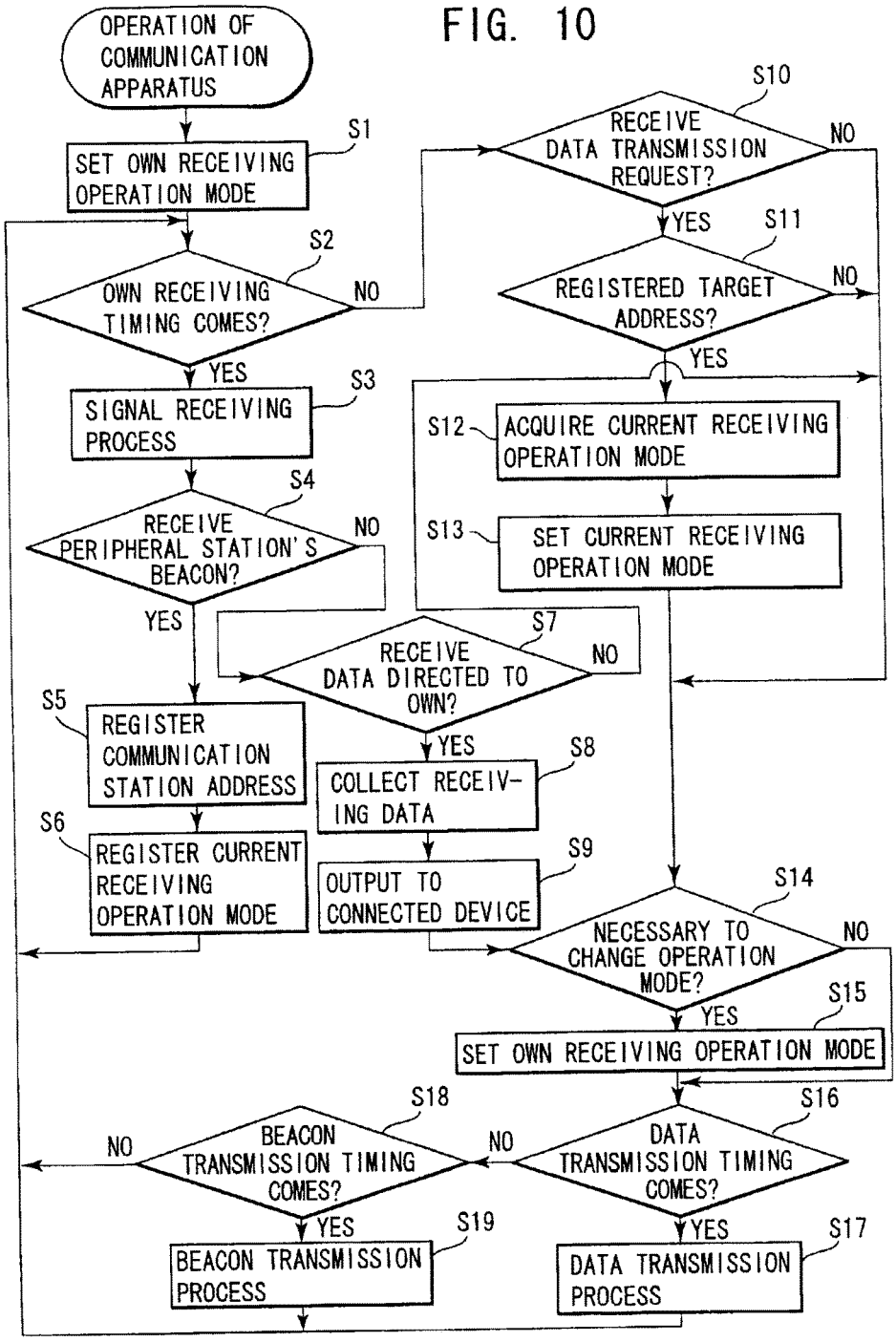
FIG. 10 is a flow chart illustrating a processing procedure for executing communication operation with managing operation modes of the own station and peripheral station autonomously by the communication station in a decentralize-autonomous type of wireless network according to the present invention.

FIG. 10 illustrates, in a decentralized-autonomous type of wireless network according the present invention, a processing procedure in a flow chart in which the communication station executes the communication operation with decentralized-autonomously managing the operation modes of the own station and its peripheral station. The processing procedure as mentioned above is actually provided in the condition that the wireless communication apparatus 100 operating as the communication station executes an execution instruction program stored in the information storage unit 113. Each wireless communication apparatus carries out the operation along this flow chart as the normal operation.

First, the own receiving operation mode is set in step S1, and the peripheral stations are informed of the its operation mode.

After that, when the own receiving timing comes in step S2, the wireless receiving unit 109 is operated to execute a signal receiving process in step S3.

When a beacon from a peripheral station is received in step S4, the address of the communication apparatus is registered in step S5, and further the receiving operation of the target communication station is registered in the management table (refer to FIG. 9) from the operation mode described in the beacon in step S6.

Further, when the data is directed to the own station in step S7, the information received at the receiving data constructing unit 111 is acquired and collected in step S8, and is supplied to the connected apparatus (application layer) via the interface 101 in step S9.

After that, the number of times of the received data is counted, and it is judged whether the change of the receiving operation mode is necessary in step S14. If the change is necessary, the own receiving operation mode is changed in step S15. If the number of times of the received data, namely, a receiving frequency increases, the operation mode is changed to that having a higher activity, and when the receiving frequency decreases, the operation mode is changed to that having a lower activity.

Further, when the data information to be transmitted from the apparatus (application layer) connected via the interface 101 is received in step S10, with reference to a management table (refer to FIG. 9) of adjacent apparatus information, it is judged whether the partner address is registered in step S11. If the partner address is registered, the receiving operation mode is acquired from the corresponding management table in step S12, and the value is set as the transmitting operation mode of the corresponding communication station in step S13.

Further, depending on the operation mode of the partner, it is judged whether the change of the receiving operation mode is necessary in step S14. If the change of the operation mode is necessary, the own receiving operation mode is changed in step S15.

Further, for example, if an instruction is received which indicates inhibition of change from a predetermined operation mode in accordance with a request, for example, from the connected apparatus (application layer) via the interface 101, the change of the operation mode is not executed.

If an instruction is received to make transition to a predetermined operation mode in accordance with a request from the apparatus (application layer) connected via the interface 101, the transition to the specified operation mode is sequentially made.

After that, when data transmission timing comes in step S 16, the transmission process of data is executed to the specified communication apparatus in step S17.

After that, when the beacon transmission timing comes in step S18, the transmission process of the beacon is executed with the set own receiving operation mode or the like being dealt as parameters in step S19.

Hereinafter, the sequence including these items is repeatedly executed in accordance with this flow chart.

Figure 11:
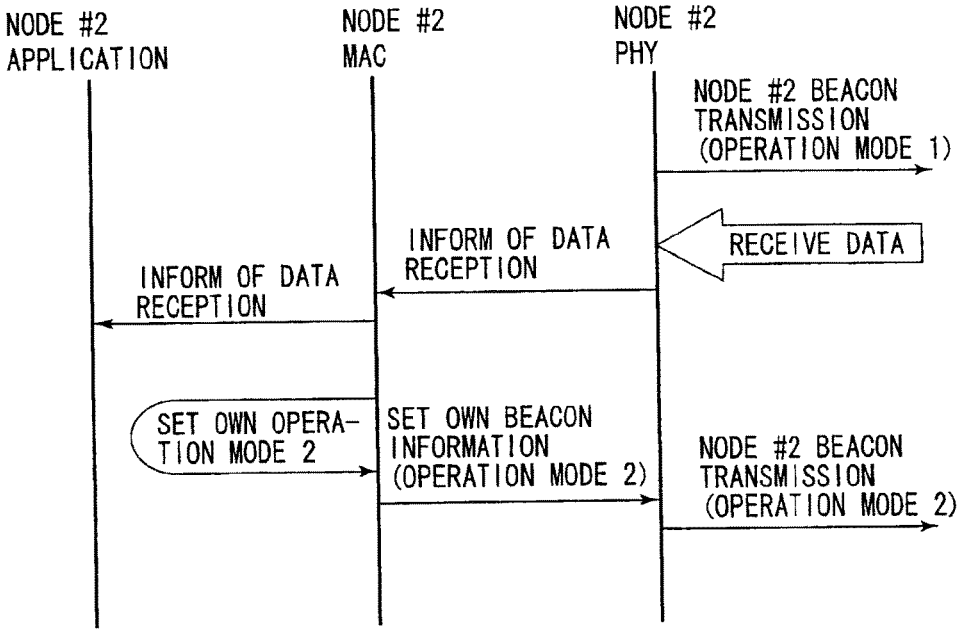
FIG. 11 is a drawing illustrating a processing procedure for setting a receiving operation mode at a communication station.

In step S14 in the flow chart shown in FIG. 10, the change of the receiving operation mode is executed. FIG. 11 illustrates a processing procedure for setting the receiving mode in the communication station.

First, if the operation mode of the own station Node #2 is 1, the beacon signal describing the operation mode is transmitted on the wireless transmission path from the PHY layer of the Node #2.

After that, if the data directed to the own station is received in the PHY layer of the Node #2, the MAC layer of the Node #2 is informed of the data reception, and thus, informs the application layer of the data reception.

Further, the MAC layer of the Node #2 makes judgment with the data reception being dealt as a trigger as to whether the change of the own receiving mode is necessary. If it is necessary, the own operation mode is shifted from 1 to 2, and the own beacon information is set the operation mode 2 in the PHY layer of the Node #2. The operation mode is transmitted on the wireless transmission path at predetermined timing from the PHY layer of the Node #2.

The peripheral stations collecting the beacon from the Node #2 acquire that the operation mode of the Node #2 shifts into the operation mode 2.

In this case, the beacon is periodically transmitted, so that even if the reception of the beacon during a certain superframe period is in failure, it is able to acquire an updated condition by receiving the beacon in the successive frame period.

Figure 12:
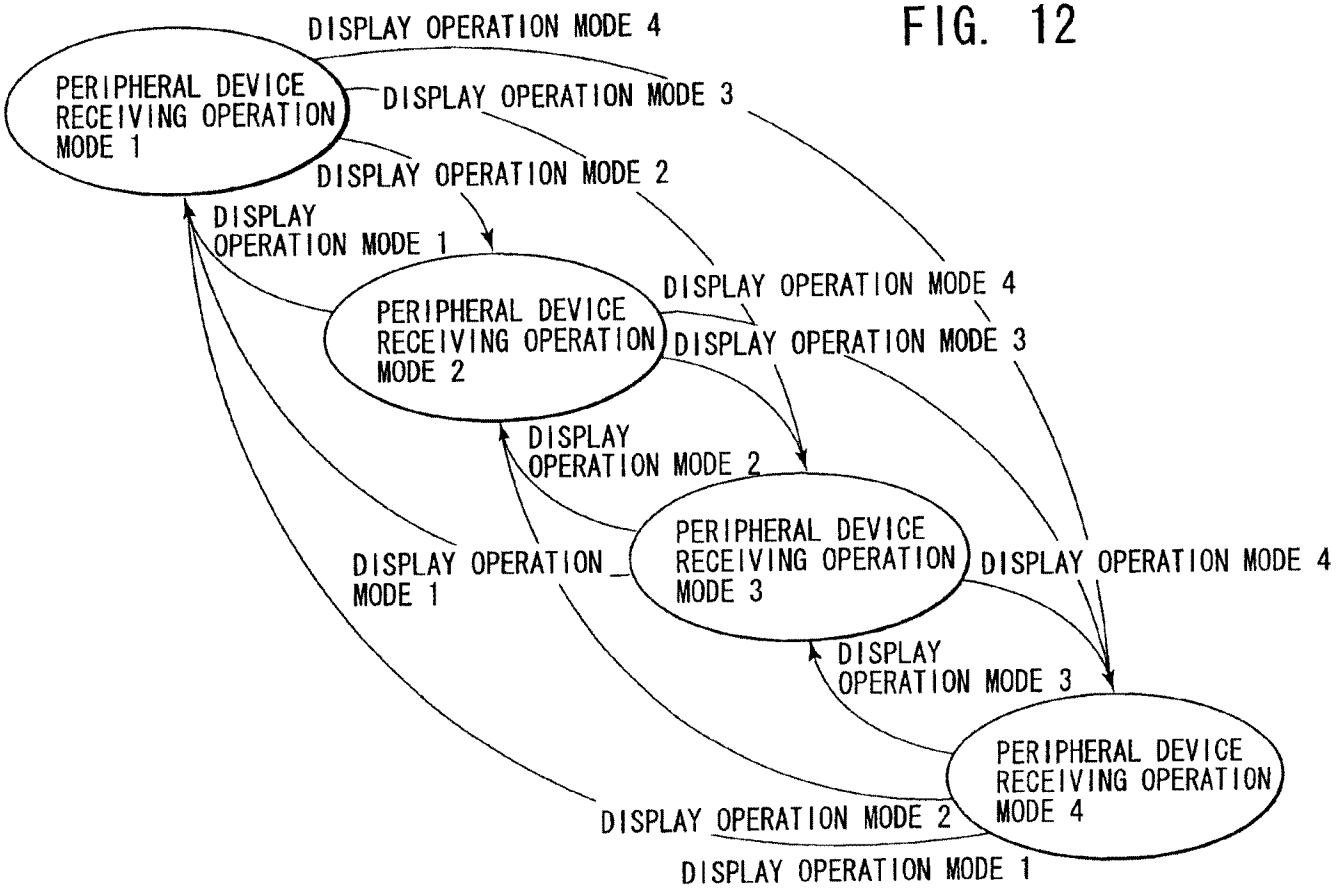
FIG. 12 is a state transition diagram used for managing operation modes of peripheral stations by the communication station.

FIG. 12 illustrates a state transition diagram used to manage the operation modes of the peripheral stations by a communication station. In the example shown in the same drawing, each communication station uses four operation modes 1 to 4. This operation mode management is individually executed every time when a beacon signal from any of communication apparatus existing there-around.

In the corresponding management table of a beacon transmission source, if it is in the operation mode 1, when the beacon signal includes indication of the operation mode 2, the operation mode shifts to the operation mode 2.

Further, if it is in the operation mode 1, when the beacon signal includes indication of the operation mode 3, the operation mode shifts to the operation mode 3.

Further, if it is in the operation mode 1, when the beacon signal includes indication of the operation mode 4, the operation mode shifts to the operation mode 4.

Further, if it is in the operation mode 2, when the beacon signal includes indication of the operation mode 3, the operation mode shifts to the operation mode 3.

Further, if it is in the operation mode 2, when the beacon signal includes indication of the operation mode 4, the operation mode shifts to the operation mode 4.

Further, if it is in the operation mode 2, when the beacon signal includes indication of the operation mode 1, the operation mode shifts to the operation mode 1.

Further, if it is in the operation mode 3, when the beacon signal includes indication of the operation mode 4, the operation mode shifts to the operation mode 4.

Further, if it is in the operation mode 3, when the beacon signal includes indication of the operation mode 1, the operation mode shifts to the operation mode 1.

Further, if it is in the operation mode 3, when the beacon signal includes indication of the operation mode 2, the operation mode shifts to the operation mode 2.

Further, if it is in the operation mode 4, when the beacon signal includes indication of the operation mode 1, the operation mode shifts to the operation mode 1.

Further, if it is in the operation mode 4, when the beacon signal includes indication of the operation mode 2, the operation mode shifts to the operation mode 2.

Further, if it is in the operation mode 4, when the beacon signal includes indication of the operation mode 3, the operation mode shifts to the operation mode 3.

Figure 13:
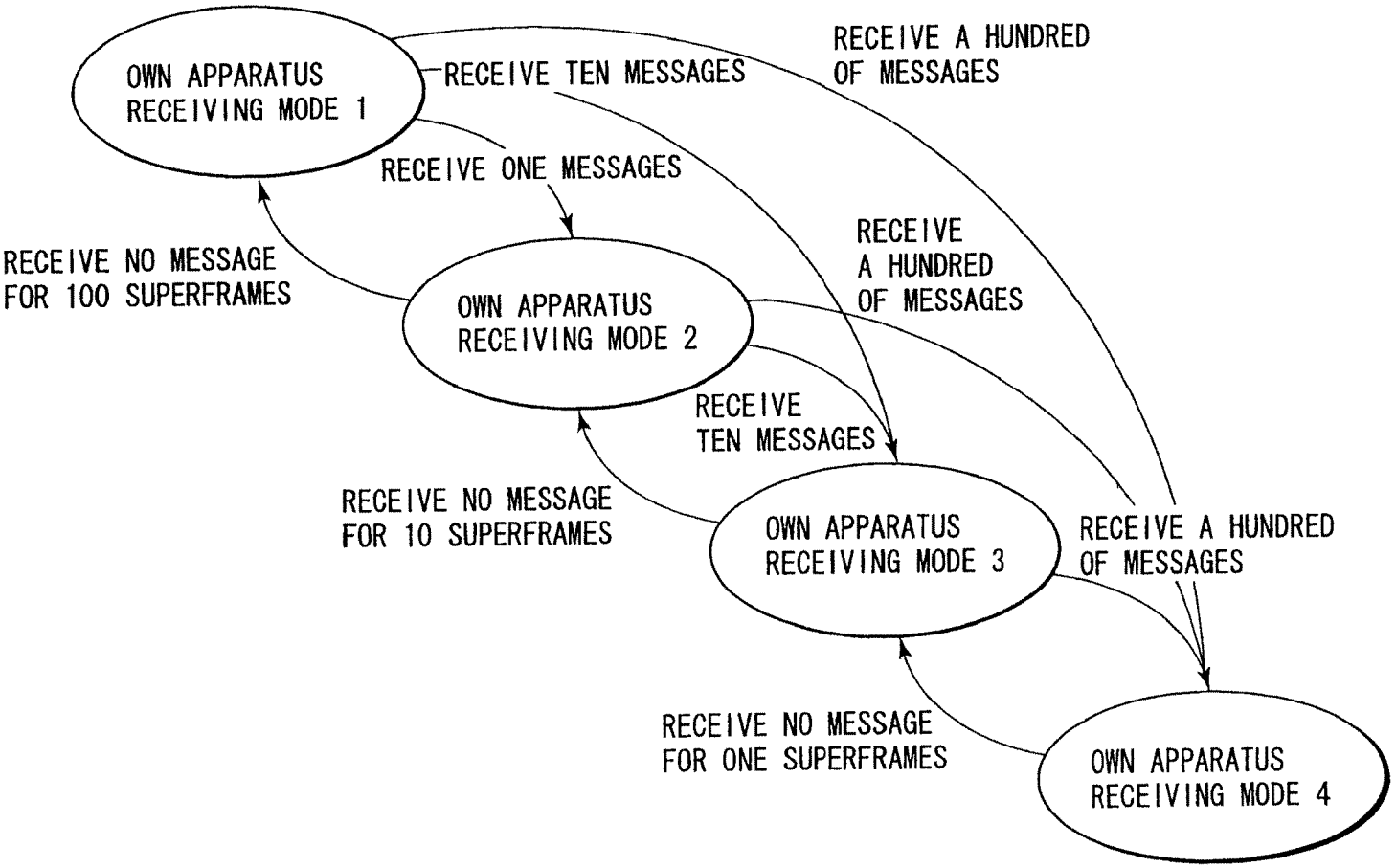
FIG. 13 is a state transition diagram for managing own station's receiving operation mode by the communication.

FIG. 13 illustrates a state transition diagram for managing the operation modes of the own communication station. In the example shown in the same drawing, the operation mode is shifted in accordance with the frequency of received messages directed to own station within a predetermined period.

If it is in the operation modes 1 and 2, the operation mode is shifted to the operation mode 3 due to the reception of ten messages.

If it is in the operation modes 1, 2, and 3, the operation mode is shifted to the operation mode 4 due to the reception of a hundred of messages.

Further, an example of shifting the operation mode is shown wherein there is no reception of messages over the superframe period.

In the operation mode 4, if no message is received over one superframe, the operation mode is shifted to the operation mode 3.

Further, in the operation mode 3, if no message is received over ten superframes, the operation mode is shifted to the operation mode 2.

Further, in the operation mode 2, if no message is received over a hundred superframes, the operation mode is shifted to the operation mode 1.

Further, such a system can be considered in which each communication station prepares a plurality of active levels and operates at a low active level in the usual state, and every time when the data communication occurs, the own active level is increased, and further to the receiving targets, a request message for increasing the active level is transmitted. In this case, if the request message and its ACK are not exchanged, increasing operation of the active level is not executed, so that the transmission data is not transmitted. That is, latency up to the data transmission becomes large. Further, every time when the data transmission occurs, it is necessary to increase the active level by one step and the request message has to be transmitted at every occasion.

Further, a method is considered in which transmission of broadcast signal increases activity levels of adjacent stations and it is acquired whether activity levels of all peripheral stations have increased. In this case, if all adjacent stations are activated by the broadcast transmission, the receiving operation should be made for stations not relating to the data transmission, and this prevents power saving operation.

On the other hand, in the wireless network according to the present invention, each communication station mainly executes the control for decentralized-autonomously managing the own station, and it is not necessary to control the transmission by synchronizing the activity levels of all peripheral stations.

As described above, with reference to specific embodiments, the present invention has been described in detail. However, it will be obvious to those skilled in the art that various changes and modifications may be made without departing from scope of the invention. As the invention has been described in an illustrative manner, the description of the specification should not be interpreted limitedly therein. Therefore, the scope of the invention is to be determined by the appended claims.

What is claimed is:

[1. A communication apparatus configured to perform wireless communication in a network including at least another communication apparatus, the communication apparatus comprising:

a transmitting and receiving unit configured to operate in one of at least three active modes concerning low power consumption operation, each of the at least three active levels specifying a condition for operation of the receiving unit, wherein at a first active mode of the at least three active modes, the transmitting and receiving unit is configured to perform a reception operation for a designated time period after the transmission of the beacon signal;

at a second active mode of the at least three active modes, the transmitting and receiving unit is configured to perform a reception operation for a designated time period after the transmission of the beacon signal and at a timing different from after the transmission of the beacon signal, at a third active mode of the at least three active modes, the transmitting and receiving unit is configured to perform a transmission or reception operation during an entire time period between subsequent transmissions of the beacon signal, the transmitting and receiving unit is configured to transmit own active modes information and receive active modes information from the another communication apparatus, and the transmitting and receiving unit is configured to transmit a signal based on the active modes information of the another communication apparatus.]

[2. The communication apparatus according to claim 1, wherein the communication apparatus further comprises:

a management unit configured to manage the active modes information of the another communication apparatus, wherein the active modes information of the another communication apparatus includes transmitting active modes information and receiving active modes information.]

[3. The communication apparatus according to claim 1, wherein the communication apparatus further comprises:

a management unit configured to manage active modes information of a plurality of other communication apparatus, by setting a different active mode to each of the other communication apparatus.]

[4. A method implemented on a communication apparatus configured to perform wireless communication in a network including at least another communication apparatus, the method comprising:

operating, at a transmitting and receiving unit configured, in one of at least three active modes concerning low power consumption operation, each of the at least three active levels specifying a condition for operation of the receiving unit, performing, when the transmitting and receiving unit is operating at a first active mode of the at least three active modes, a reception operation for a designated time period after the transmission of the beacon signal;

performing, when the transmitting and receiving unit is operating at a second active mode of the at least three active modes, a reception operation for a designated time period after the transmission of the beacon signal and at a timing different from after the transmission of the beacon signal, performing, when the transmitting and receiving unit is operating at a third active mode of the at least three active modes, a transmission or reception operation during an entire time period between subsequent transmissions of the beacon signal, transmitting, at the transmitting and receiving unit, own active modes information and receive active modes information from the another communication apparatus, and transmitting, at the transmitting and receiving unit, a signal based on the active modes information of the another communication apparatus.]

[5. The method according to claim 4, further comprising managing the active modes information of the another communication apparatus, wherein the active modes information of the another communication apparatus includes transmitting active modes information and receiving active modes information.]

[6. The method according to claim 4, further comprising: managing the active modes information of a plurality of other communication apparatuses, by setting a different active mode to each of the other communication apparatuses.]

[7. A communication system for wireless communication in a network including a plurality of communication apparatuses, the communication system comprising:

a transmitting and receiving unit configured to operate in one of at least three active modes concerning low power consumption operation, each of the at least three active levels specifying a condition for operation of the receiving unit, wherein at a first active mode of the at least three active modes, the transmitting and receiving unit is configured to perform a reception operation for a designated time period after the transmission of the beacon signal;

at a second active mode of the at least three active modes, the transmitting and receiving unit is configured to perform a reception operation for a designated time period after the transmission of the beacon signal and at a timing different from after the transmission of the beacon signal, at a third active mode of the at least three active modes, the transmitting and receiving unit is configured to perform a transmission or reception operation during an entire time period between subsequent transmissions of the beacon signal, a second communication apparatus, including:

a transmitting and receiving unit configured to operate in one of the first active mode, the second active mode, and the third active mode when not operating in a sleep state, wherein the transmitting and receiving unit of the first communication apparatus is configured to transmit own active modes information to the second communication apparatus and receive active modes information from the second communication apparatus, and the transmitting and receiving unit of the first communication apparatus is configured to transmit a signal based on the active modes information of the second communication apparatus.]

[8. The communication system according to claim 7, wherein the first communication apparatus further comprises:

a management unit configured to manage the active modes information of the second communication apparatus, wherein the active modes information of the second communication apparatus includes transmitting active modes information and receiving active modes information.]

[9. The communication system according to claim 7, wherein the first communication apparatus further comprises:

a management unit configured to manage active modes information of a plurality of other communication apparatus, by setting a different active mode to each of the other communication apparatus.]

*10. A wireless communication device comprising processing circuitry configured to*

*operate in one of at least three active modes concerning low power consumption;*

*operate in a first active mode where the wireless communication device is continuously active during a beacon transmission interval during which time the wireless communication device transmits a beacon signal;*

*operate in a second active mode where the wireless communication device is absent at a prescheduled timing set relative to the transmission of the beacon signal during the beacon transmission interval;*

*operate in a third active mode where the wireless communication device limits an operation of communication after transmission of a beacon, the third active mode having a prescheduled active period set relative to the transmission of the beacon signal shorter than a prescheduled active period set relative to the transmission of the beacon signal in the second active mode;*

*generate and transmit own information of at least one of active modes to a different wireless communication device;*

*receive information of at least one of active modes from the different wireless communication device; and*

*transmit a signal based on the information received from the different wireless communication device.*

*11. The wireless communication device according to claim 10, wherein the processing circuitry is further configured to determine a timing of an operation of communication to be a timing of when a reception operation of another wireless communication device is active.*

*12. The wireless communication device according to claim 11, further comprising:*

*a memory that stores a current active mode of the another wireless communication device.*

*13. A method, implemented by a wireless communication device configured to operate in one of at least three active modes concerning low power consumption, comprising:*

*operating, by the wireless communication device, in a first active mode where the wireless communication device is continuously active during a beacon transmission interval during which time the wireless communication device transmits a beacon signal;*

*operating in a second active mode where the wireless communication device is absent at a prescheduled timing set relative to the transmission of the beacon signal during the beacon transmission interval;*

*operating in a third active mode where the wireless communication device limits an operation of communication after transmission of a beacon, the third active mode having a prescheduled active period set relative to the transmission of the beacon signal shorter than a prescheduled active period set relative to the transmission of the beacon signal in the second active mode;*

*generating and transmitting own information of at least one of active modes to a different wireless communication device;*

*receiving information of at least one of active modes from the different wireless communication device; and*

*transmitting a signal based on the information received from the different wireless communication device.*

*14. The method according to claim 13, further comprising determining a timing of an operation of communication to be a timing of when a reception operation of another wireless communication device is active.*

*15. The method according to claim 14, further comprising:*

*storing, by a memory, a current active mode of the another wireless communication device.*

*16. A communication system for wireless communication in a network including a plurality of wireless communication devices, the communication system comprising:*

*a first wireless communication device, including:*

*processing circuitry configured to*

*operate in one of at least three active modes concerning low power consumption:*

*operate in a first active mode where the wireless communication device is continuously active during a beacon transmission interval during which time the first wireless communication device transmits a beacon signal,*

*operate in a second active mode where the wireless communication device is absent at a prescheduled timing set relative to the transmission of the beacon signal during the beacon transmission interval,*

*operate in a third active mode where the wireless communication device limits an operation of communication after transmission of a beacon, the third active mode having a prescheduled active period set relative to the transmission of the beacon signal shorter than a prescheduled active period set relative to the transmission of the beacon signal in the second active mode,*

*generate and transmit own information of at least one of active modes to a second wireless communication device,*

*receive information of at least one of active modes from the second wireless communication device, and*

*transmit a signal based on the information received from the second wireless communication device, and*

*the second wireless communication device, including:*

*processing circuitry configured to:*

*operate in one of the first active mode where the second wireless communication device is continuously active during the beacon transmission interval during which time the second wireless communication device transmits a beacon signal, the second active mode, where the second wireless communication device is absent at a prescheduled timing set relative to the transmission of the beacon signal during the beacon transmission interval and the third active mode where the second wireless communication device limits an operation of communication after transmission of a beacon.*

*17. The system according to claim 16, wherein the processing circuitry of first wireless communication device is further configured to determine a timing of an operation of communication to be a timing of when a reception operation of the second wireless communication device is active.*

*18. The system according to claim 17, wherein the first wireless communication device further comprises:*

*a memory that stores a current active mode of the second wireless communication device.*

*19. A wireless communication device comprising computer circuitry configured to*

*operate in one of at least three active modes concerning low power consumption;*

*operate in a first active mode where the wireless communication device is continuously active during a beacon transmission interval during which time the wireless communication device transmits a beacon signal;*

*operate in a second active mode where the wireless communication device is absent at a prescheduled timing set relative to the transmission of the beacon signal during the beacon transmission interval;*

*operate in a third active mode where the wireless communication device limits an operation of communication after transmission of a beacon, the third active mode having a prescheduled active period set relative to the transmission of the beacon signal shorter than a prescheduled active period set relative to the transmission of the beacon signal in the second active mode;*

*generate and transmit own information of at least one of active modes to a different wireless communication device;*

*receive information of at least one of active modes from the different wireless communication device; and*

*transmit a signal based on the information received from the different wireless communication device.*

*20. The wireless communication device according to claim 19, wherein the computer circuitry is further configured to determine a timing of an operation of communication to be a timing of when a reception operation of another wireless communication device is active.*

*21. The wireless communication device according to claim 20, further comprising:*

*a memory that stores a current active mode of the another wireless communication device.*

*22. A wireless communication device comprising*

*a computer system configured to*

*operate in one of at least three active modes concerning low power consumption;*

*operate in a first active mode where the wireless communication device is continuously active during a beacon transmission interval during which time the wireless communication device transmits a beacon signal;*

*operate in a second active mode where the wireless communication device is absent at a prescheduled timing set relative to the transmission of the beacon signal during the beacon transmission interval;*

*operate in a third active mode where the wireless communication device limits an operation of communication after transmission of a beacon, the third active mode having a prescheduled active period set relative to the transmission of the beacon signal shorter than a prescheduled active period set relative to the transmission of the beacon signal in the second active mode;*

*generate and transmit own information of at least one of active modes to a different wireless communication device;*

*receive information of at least one of active modes from the different wireless communication device; and*

*transmit a signal based on the information received from the different wireless communication device.*

*23. The wireless communication device according to claim 22, wherein the computer system is further configured to determine a timing of an operation of communication to*

*be a timing of when a reception operation of another wireless communication device is active.*

*24. The wireless communication device according to claim 23, further comprising:*

*a memory that stores a current active mode of the another wireless communication device.*

* * * * *